(12) United States Patent
Tsuruta

(10) Patent No.: US 7,416,044 B2
(45) Date of Patent: Aug. 26, 2008

(54) TUMBLE SENSORS FOR A SADDLE RIDE TYPE ALL-TERRAIN VEHICLE

(75) Inventor: Yuichiro Tsuruta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 11/011,782

(22) Filed: Dec. 15, 2004

(65) Prior Publication Data
US 2005/0161274 A1   Jul. 28, 2005

(30) Foreign Application Priority Data
Dec. 16, 2003 (JP) ............................. 2003-417940

(51) Int. Cl.
*B60K 28/014* (2006.01)
(52) U.S. Cl. .................... 180/282; 180/284; 340/440
(58) Field of Classification Search ............... 180/282, 180/284; 340/901, 440
See application file for complete search history.

(56) References Cited

U.S. PATENT DOCUMENTS

| | | | | |
|---|---|---|---|---|
| 2,100,105 A | * | 11/1937 | Lee et al. ..................... 340/467 |
| 2,757,749 A | * | 8/1956 | Cooper et al. ............... 180/283 |
| 2,917,126 A | * | 12/1959 | Phillips ....................... 180/285 |
| 2,986,614 A | * | 5/1961 | Minch ........................ 200/61.5 |
| 3,599,745 A | * | 8/1971 | Hughes ...................... 180/284 |
| 3,671,933 A | * | 6/1972 | Barnes ....................... 340/440 |
| 3,763,956 A | * | 10/1973 | Ruff ........................... 180/283 |
| 3,772,643 A | * | 11/1973 | Dodd et al. ................. 340/440 |
| 3,882,957 A | * | 5/1975 | Fritz .......................... 180/284 |
| 4,349,809 A | * | 9/1982 | Tomes ........................ 340/440 |
| 4,528,547 A | * | 7/1985 | Rodney ...................... 340/439 |
| 5,099,884 A | * | 3/1992 | Monahan ................... 137/827 |
| 5,143,386 A | * | 9/1992 | Uriarte ....................... 254/418 |
| 5,525,901 A | * | 6/1996 | Clymer et al. ............ 324/207.21 |
| 5,531,290 A | * | 7/1996 | Furuichi et al. ............ 180/271 |
| 5,602,371 A | * | 2/1997 | Kerns et al. ............... 200/61.47 |
| 5,777,290 A | * | 7/1998 | Tzanev ..................... 200/61.52 |
| 5,825,284 A | * | 10/1998 | Dunwoody et al. ......... 340/440 |
| 6,139,053 A | * | 10/2000 | Knox .......................... 280/735 |
| 6,321,141 B1 | * | 11/2001 | Leimbach ...................... 701/1 |
| 6,397,133 B1 | * | 5/2002 | van der Pol et al. ........... 701/37 |
| 6,446,980 B1 | * | 9/2002 | Kutscher et al. ........... 280/5.508 |
| 6,543,147 B2 | * | 4/2003 | Akieda ..................... 33/366.24 |
| 6,593,849 B2 | * | 7/2003 | Chubb et al. ................ 340/446 |

(Continued)

FOREIGN PATENT DOCUMENTS

DE          3714111          12/1988

(Continued)

*Primary Examiner*—Kevin Hurley
*Assistant Examiner*—Timothy Wilhelm
(74) *Attorney, Agent, or Firm*—Westerman, Hattori, Daniels & Adrian, LLP

(57) ABSTRACT

A saddle ride type all-terrain vehicle having an engine and a saddle type driver's seat, includes a first sensor for detecting an inclination in the left-right direction of the vehicle, a second sensor for detecting an inclination in the front rear direction of the vehicle, and a controller receiving outputs from the first and second sensors, determining a tumble condition based on the outputs, and then outputting a tumble condition signal. Further, a fuel shut-off element is provided for shutting off the supply of fuel to the engine when the tumble condition signal is received from the controller.

15 Claims, 7 Drawing Sheets

U.S. PATENT DOCUMENTS

| | | | |
|---|---|---|---|
| 6,827,172 B2 * | 12/2004 | Ide et al. | 180/282 |
| 6,938,717 B2 * | 9/2005 | Gaudiano | 180/282 |
| 6,941,206 B2 * | 9/2005 | Hasegawa et al. | 701/38 |
| 7,011,177 B2 * | 3/2006 | Machida et al. | 180/284 |
| 7,093,683 B2 * | 8/2006 | Miguchi | 180/170 |
| 7,178,377 B2 * | 2/2007 | Suzuki | 73/1.75 |
| 2003/0132837 A1 * | 7/2003 | Hasegawa et al. | 340/440 |
| 2004/0201197 A1 | 10/2004 | Takeshima et al. | |
| 2004/0256170 A1 * | 12/2004 | Gaudiano | 180/282 |
| 2005/0275516 A1 * | 12/2005 | Lang | 340/440 |
| 2006/0022812 A1 * | 2/2006 | Lang | 340/440 |

FOREIGN PATENT DOCUMENTS

| | | |
|---|---|---|
| DE | 3939410 | 6/1991 |
| DE | 2624609 | 12/1997 |
| DE | 101 42 725 A1 | 4/2002 |
| DE | 103 34 095 A1 | 2/2004 |
| JP | 60-4857 | 2/1985 |
| WO | WO 03/074351 A1 | 9/2003 |

* cited by examiner

TUMBLE SENSORS FOR A SADDLE RIDE TYPE ALL-TERRAIN VEHICLE

FIELD OF THE INVENTION

The present invention relates to a saddle ride type all-terrain vehicle, and particularly to a saddle ride type all-terrain vehicle including a sensor for detecting a tumbling (or roll over) of a vehicle body.

BACKGROUND OF THE INVENTION

In motorcycles having a fuel injection system, a system is provided for automatically stopping the engine by stopping the fuel pump when the vehicle has tumbled. For example, in a motorcycle described in Japanese Utility Model Publication No. Sho 60-4857, a spherical magnet is rollably placed inside a U-shaped groove formed in a non-magnetic case. The rolling of the spherical magnet in response to an inclination of the vehicle body is sensed by a reed switch, whereby the tumbling of the vehicle body is detected, and the engine is stopped.

Known tumble detecting sensors for a motorcycle detect when the vehicle body is inclined to either the left or right side by an amount of not less than a predetermined value. In response to this detection, the engine is stopped. In cases of motorcycles where the vehicle body may be expected to tumble to the left or right side, such a sensor detects the tumble of the vehicle body, and the engine can be stopped. In the case of a saddle ride type all-terrain vehicle (hereinafter referred to as "ATV"), on the other hand, the determination of tumble (or roll over) should be taken into account not only in the left-right direction but also in the front-rear direction, for example, when the vehicle is ascending or descending a steep slope or in like situations.

SUMMARY OF THE INVENTION

It is an object of the present invention to provide an ATV having a sensor system capable of accurately determining a tumble (or roll over), when the vehicle is traveling on a steep slope or in like situations.

In order to attain the above object, the present invention is firstly characterized in that an ATV or, a saddle ride type all-terrain vehicle having an engine and a saddle type driver's seat. The saddle ride type all-terrain vehicle, includes, a first sensor for detecting an inclination in the left-right direction of the vehicle, and a second sensor for detecting an inclination in the front rear direction of the vehicle. Further, a controller receives outputs from said first and second sensors and determines a tumble condition based on the outputs and then outputs a tumble condition signal. Additionally, a fuel shut-off element shuts off the supply of fuel to the engine when the tumble condition signal is received from the controller.

In addition, the present invention is secondly characterized in that the saddle ride type all-terrain vehicle, the first and second sensor each include a movable portion displaceable in response to inclination of the vehicle.

Further, the present invention is thirdly characterized in that in the saddle ride type all-terrain vehicle, the first and second sensors are oriented such that extension lines, corresponding to directions of movement of said movable portions, intersected orthogonally.

Further, the present invention is fourthly characterized in that in the saddle ride type all-terrain vehicle, the first and second sensors are oriented such that an extension line, corresponding to a direction of movement of said movable portion one of the first and second sensors, crosses the other of the first and second sensors.

Further, the present invention is fifthly characterized in the saddle ride type all-terrain vehicle, which also includes, a steering shaft for supporting a steering handlebar of the vehicle, and a fuel tank disposed rearward of said steering shaft, wherein the first and second sensors are disposed between the steering shaft and the fuel tank.

Furthermore, the present invention is sixthly characterized in that in the saddle ride type all-terrain vehicle, the fuel tank has a shape provided with a recess at a front portion thereof, and wherein the first and second sensors are disposed in the recess.

According to the characteristics of the present invention, the ATV has sensors capable of detecting not only the inclination in the left-right direction of the vehicle body but also the inclination in the front-rear direction of the vehicle body, so that, in the ATV, which may be expected to run while being inclined in the left-right direction and in the front-rear direction, it is possible to determine a tumble (or rollover) condition based on the outputs from the first and second sensors and to stop the supply of fuel to the engine.

As described above, the first sensor and the second sensor are disposed roughly at the same position. Specifically, the two sensors are located at the same position in the vehicle length direction or in the vehicle width direction. Therefore, it is possible to detect the front-rear inclination and the left-right inclination at roughly the same position.

In addition, as also described above, the first sensor and the second sensor are disposed in the vicinity of the steering shaft, i.e., near a central portion of the vehicle body, so that the sensors are protected from the external sprinkles or splashes of dust, mud, water, or the like during when the vehicle is traveling along rugged terrain.

According to another characteristic, the tumble sensors disposed in the recess are protected by the fuel tank, so that the sensors are less liable to be influenced by external forces.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
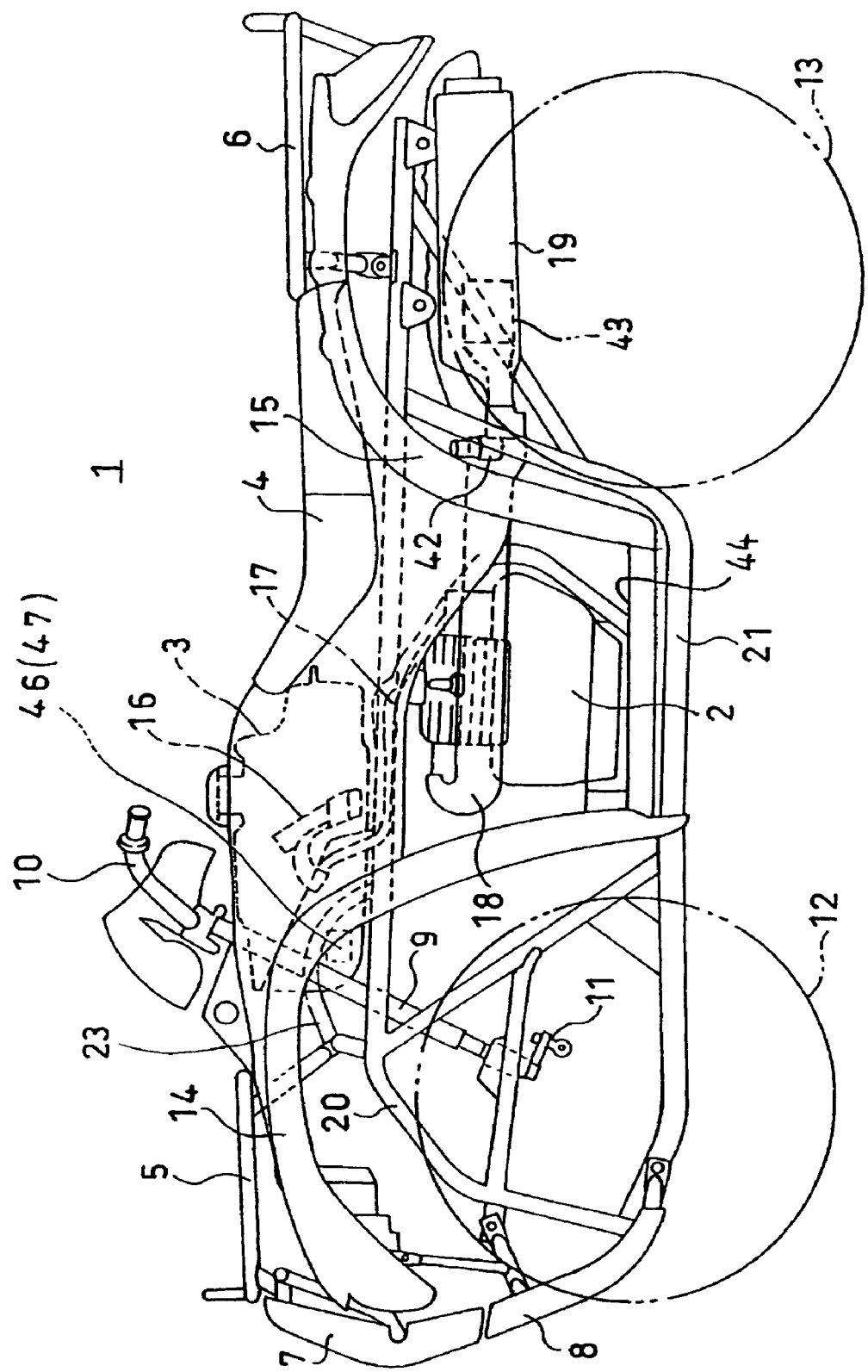
FIG. 1 is a left side view of an ATV according to one embodiment of the present invention.
Figure 2:
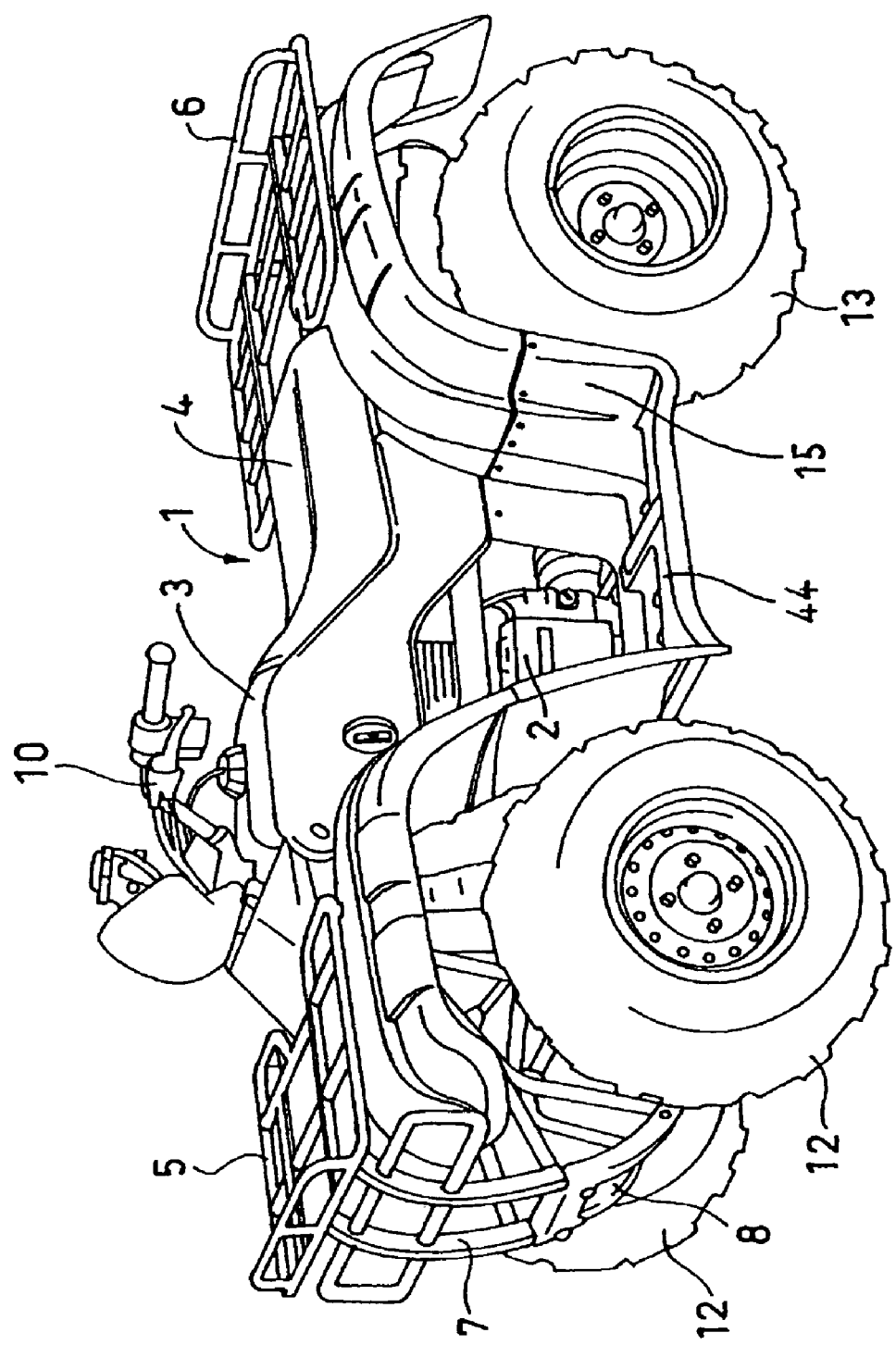
FIG. 2 is a perspective view of the ATV according to one embodiment of the present invention.
Figure 3:
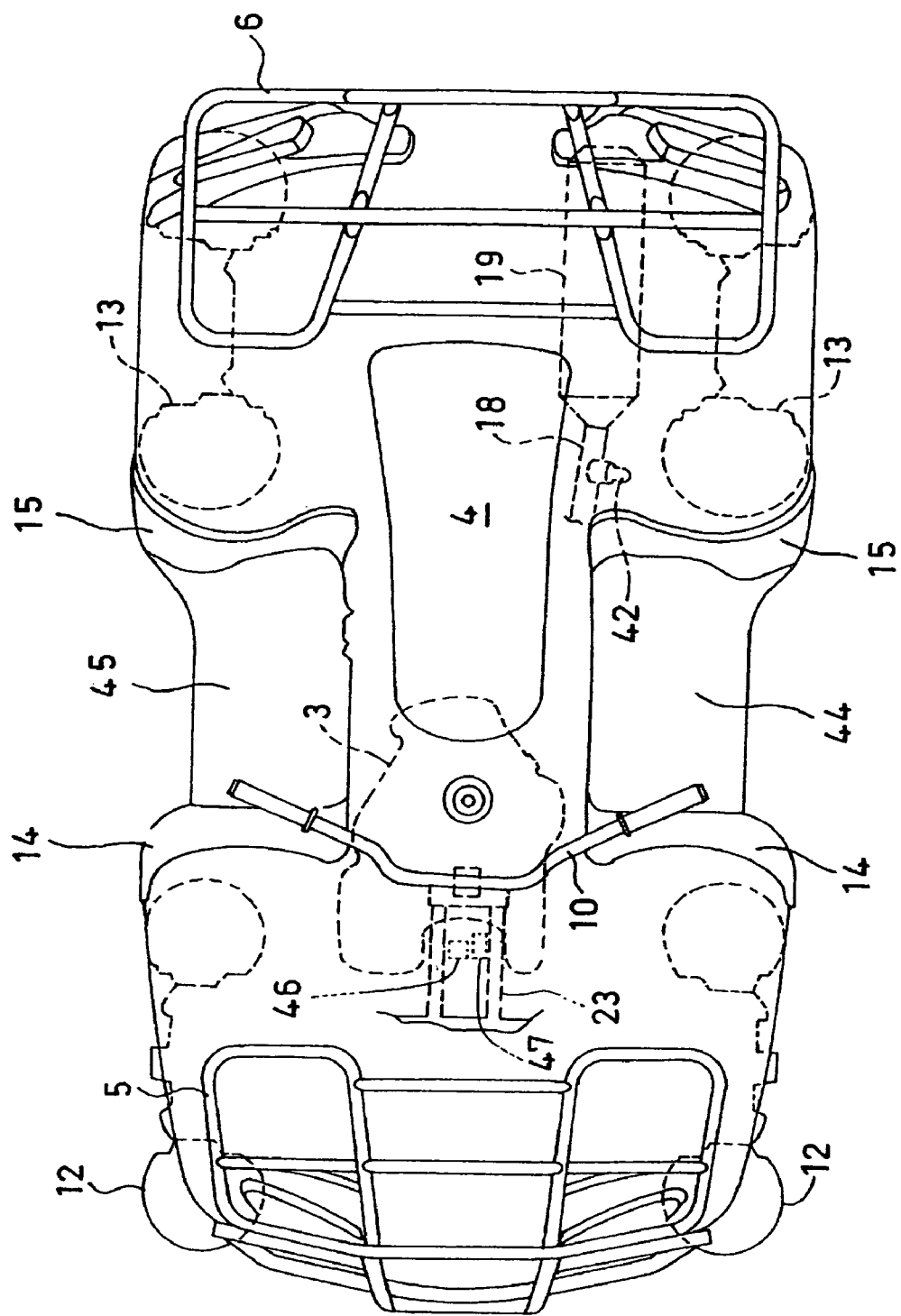
FIG. 3 is a plan view of the ATV according to one embodiment of the present invention.
Figure 4:
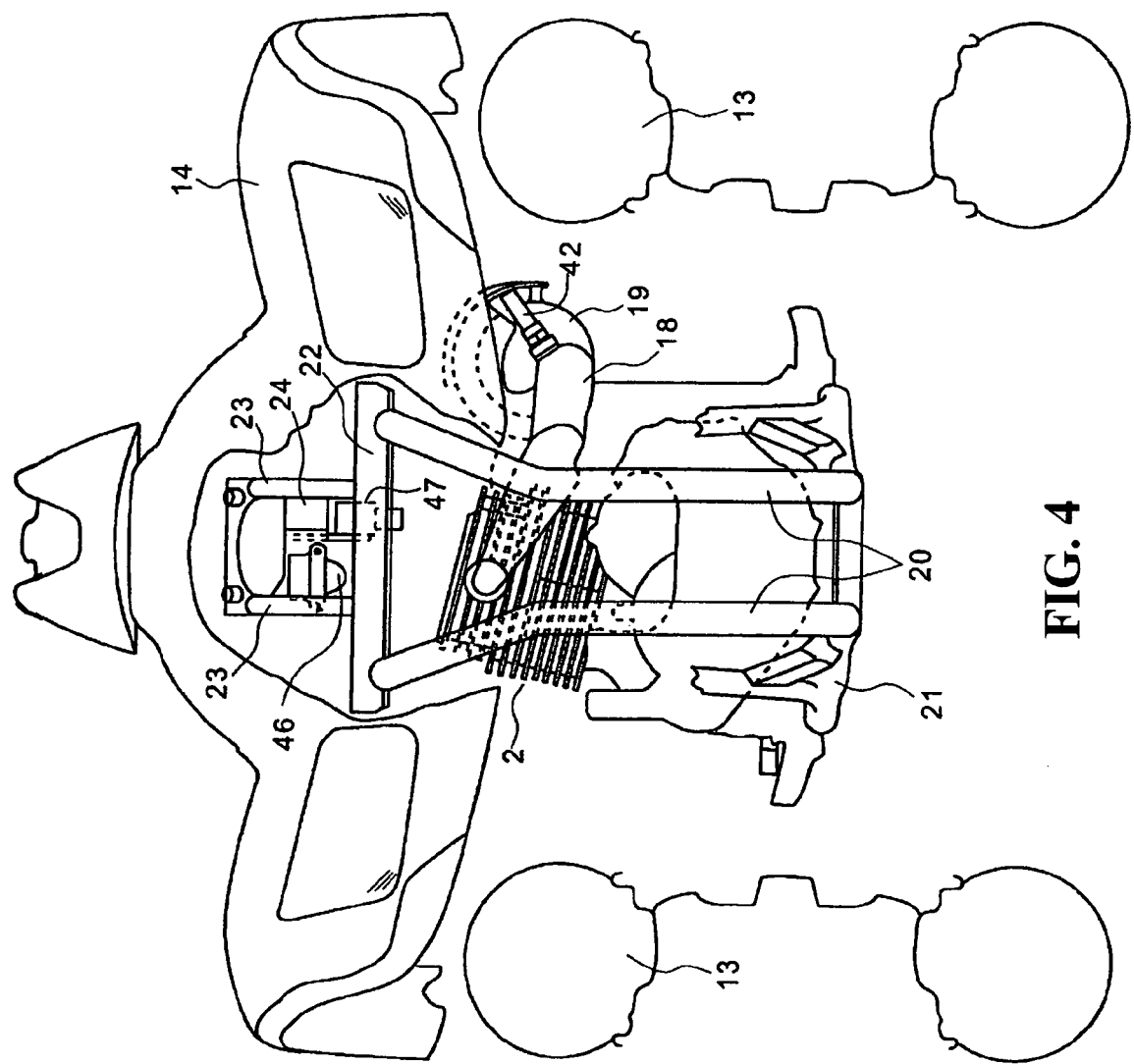
FIG. 4 is a front view of a part of the ATV according to one embodiment of the present invention.

Now, an embodiment of the present invention will be described below, referring to the drawings. FIG. 2 is a perspective view of an ATV with tumble sensors mounted thereon according to one embodiment of the present invention, FIG. 3 is a plan view of the same, and FIG. 1 is a left side view of the same. FIG. 4 is a front view showing a part of a left side portion of the ATV. In these figures, the ATV 1 includes an engine 2 located at a central portion of the vehicle body, a fuel tank 3 located on the upper side of the engine 2, a rider's seat 4 and front and rear luggage carriers 5 and 6, and a front guard 7 and an under guard 8 provided at the frontmost end of the vehicle. As understood from FIG. 3, a front portion of the fuel tank 3 is recessed toward the vehicle rear side, and a steering shaft 9 is provided extending vertically through a portion of the recess. In other words, the presence of the recess obviates the interference between the fuel tank 3 and the steering shaft 9, and enables the fuel tank 3 to be expanded to the vehicle front side. In addition, as will be described later, a tumble sensor can be provided in the space formed by the recess, and the influences of external forces on the tumble sensor can be reduced by the fuel tank 3.

A steering handlebar 10 is provided at an upper portion of the steering shaft 9, and a link 11 is provided at a lower portion of the steering shaft 9. The link 11 is connected to a front wheel 12 through a connection device not shown. Rear wheels 13 are provided at rear portions of the vehicle. A front fender 14 and a rear fender 15 including wheel wells are provided on the upper side of the front wheel 12 and the rear wheels 13 so as to cover the wheels 12 and 13. Foot rests 44 and 45 for the rider seated astride the rider's seat 4 to put his feet on are provided between the front fender 14 and the rear fender 15.

A fuel pump 16 is contained in the fuel tank 3, and fuel pumped up by the fuel pump 16 is supplied to a fuel injection valve (not shown) through a fuel hose 17. An exhaust pipe 18 led out from the engine 2 to the front side is led around a lateral side of the engine 2 to extend rearwards, and is connected to a muffler 19 disposed on the vehicle rear side. A catalyst 43 for cleaning and removing harmful components contained in the exhaust gas is provided inside of muffler 19. An oxygen concentration sensor 42 is provided in the vicinity of a connection portion of the exhaust pipe 18 for connection with the muffler 19, namely, on the immediate upstream side of the catalyst 43.

The ATV 1 includes a control system for detecting the air-fuel ratio of an air-fuel mixture combusted in the engine 2 based on the concentration of oxygen in the exhaust gas and determining the amount of fuel injected by a fuel injection system based on the detection results (the fuel injection system and the control system are known and are therefore not shown in the figures). The oxygen concentration sensor 42 is provided for detecting the oxygen concentration in the exhaust gas and supplying the detection results to the control system.

The exhaust pipe 18 is exposed to the exterior at a lateral side of the engine 12, and its portion on the rear side extends into an inside space surrounded by the rear fender 15. Thus, the oxygen concentration sensor 42 is away from the feet of the rider seated astride the rider's seat 4, and is protected by the fender 15. Therefore, the oxygen concentration sensor 42 is not projecting to the upper side of the foot rest 44 to hamper the movements of the rider's feet, so that the oxygen concentration sensor 42 does not spoil the living-comfort properties (ride comfort) for the rider and can be provided with good performance of protection against external forces.

The ATV 1 includes main frames 20 and an under frame 21, and the individual components of the vehicle are supported by the frames 20 and 21 and pipes or plates such as sub-frames and brackets, which are connected to the frames 20 and 21.

Tumble sensors 46 and 47 are provided between the fuel tank 3 and the steering shaft 9, by utilizing the portion of the recess of the fuel tank 3. The tumble sensors 46 and 47 can be mounted to brackets (shown in FIG. 7) connected to the main frames 20. The sensor 46 is a left-right tumble sensor to generate an output according to the inclination of the vehicle body when the vehicle body is inclined in the left-right direction. On the other hand, the sensor 47 is a front-rear tumble sensor to generate an output according to the inclination of the vehicle body when the vehicle body is inclined in the front-rear direction.

Figure 7:
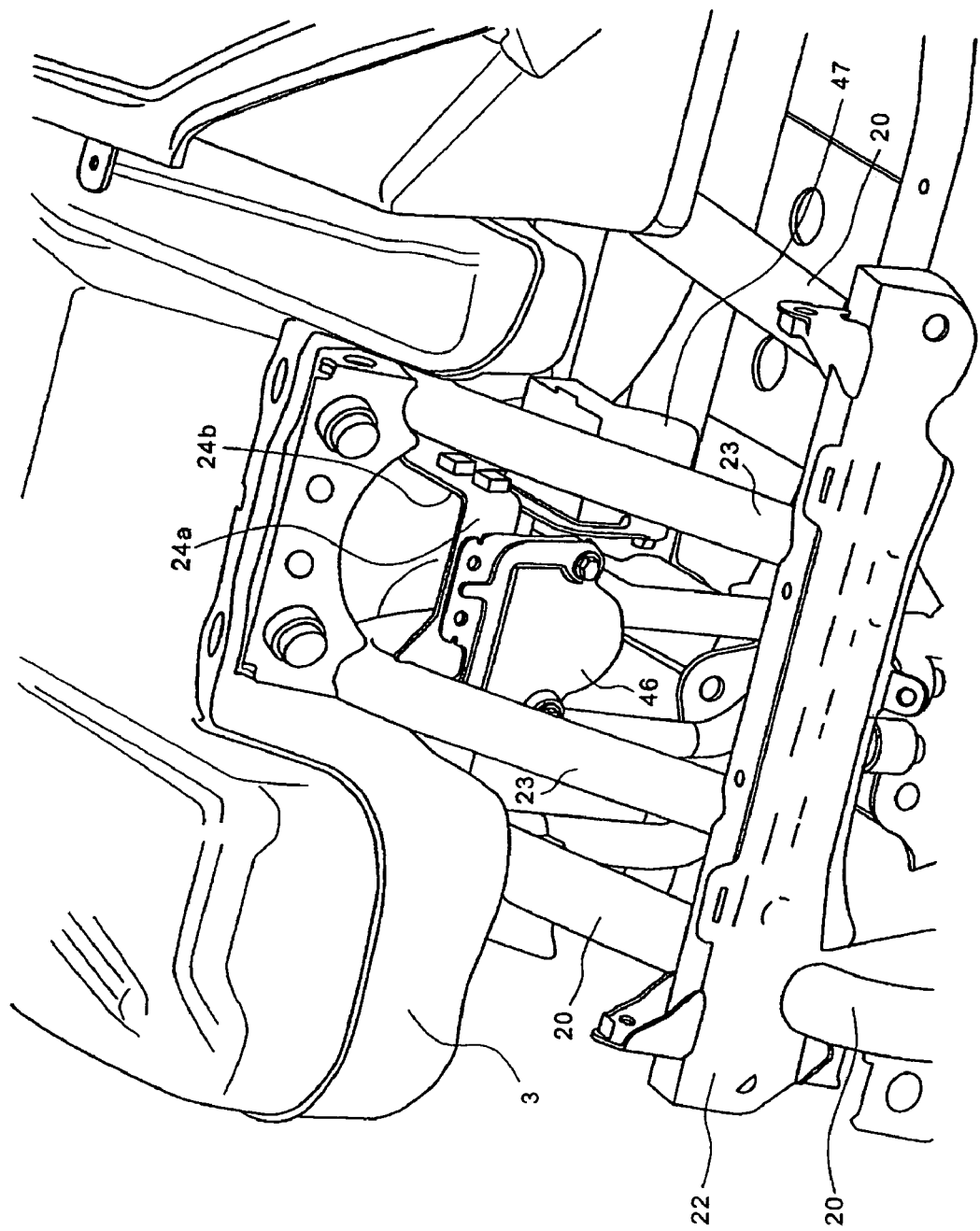
FIG. 7 is a perspective view of part of the ATV, showing the layout of the tumble sensors.

FIG. 7 is a perspective view of an essential part of the vehicle body, showing the layout of the tumble sensors 46 and 47. Next, the layout of the tumble sensors and a support structure therefor will be described referring principally to FIGS. 4 and 7. A bar 22 extending in the vehicle body left-right direction is joined to the main frames 20, 20, and two sub-frames 23, 23, extending rearward through the recess of the fuel tank 3, are joined to the bar 22 so as to extend toward the vehicle body rear side therefrom. A sensor mounting stay 24 is bridgingly provided between the sub-frames 23, 23.

The steering shaft 9 is disposed to pass vertically between the stay 24 and the bar 22, between the sub-frames 23, 23. Therefore, the tumble sensors 46 and 47 supported by the stay 24 are disposed in the space formed by the recess of the fuel tank 3 and on the rear side of the steering shaft 9.

The stay 24 includes a mount surface 24*a* for the tumble sensor 46 and a mount surface 24*b* for the tumble sensor 47. The mount surface 24*a* is a surface orthogonal to the running (or traveling) direction of the ATV 1, while the mount surface 24*b* is a surface formed along the running direction. The tumble sensor 46 is fixed to the mount surface 24*a* by a bolt or the like, and the tumble sensor 47 is fixed to the mount surface 24*b* by a bolt or the like.

Figure 5A:
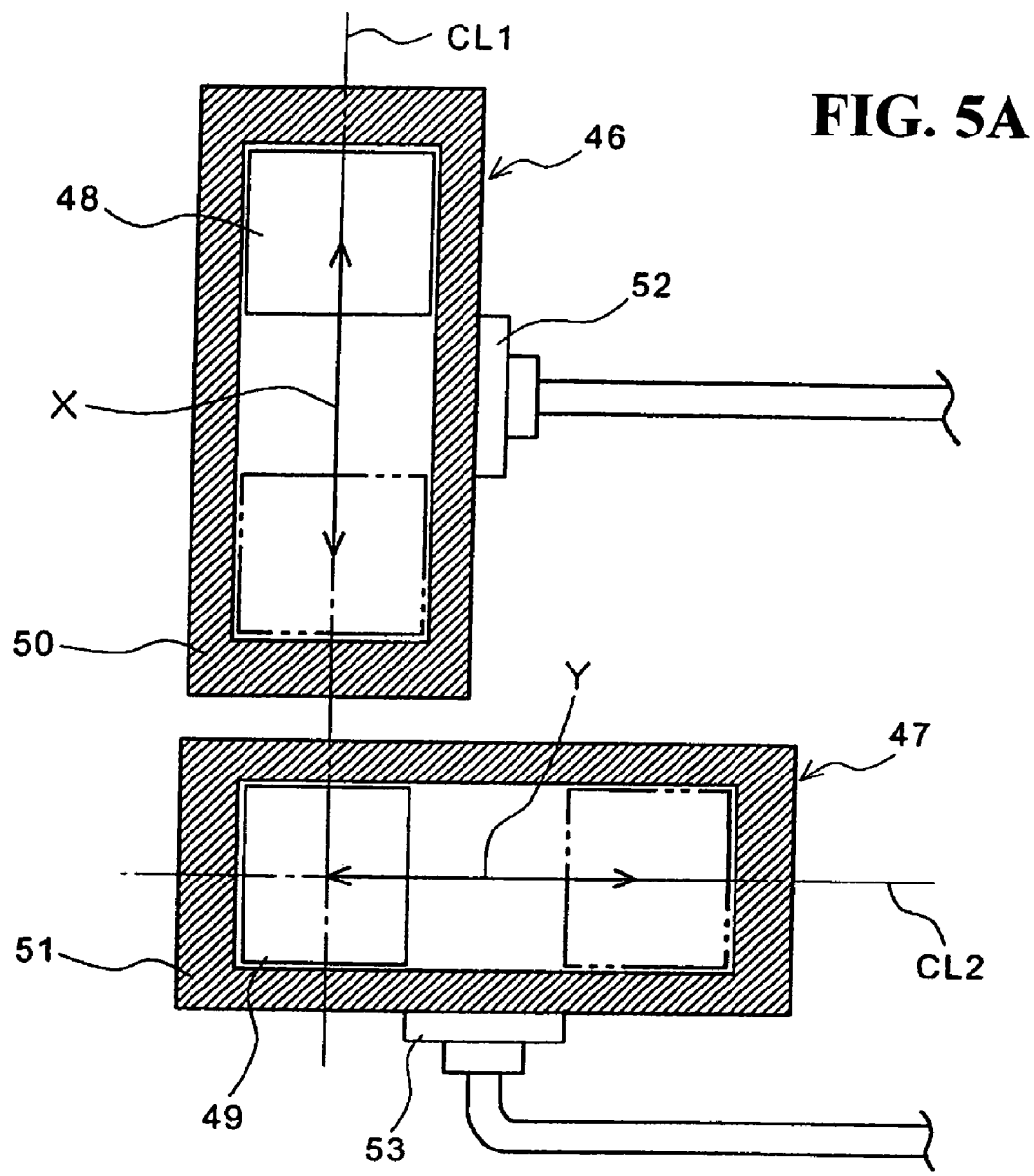
FIG. 5A is a plan sectional view of a tumble sensor.
Figure 5B:
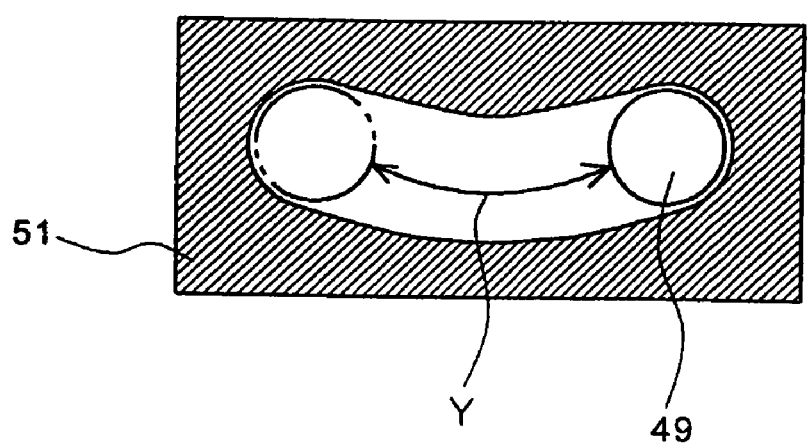
FIG. 5B is a front sectional view of the tumble sensor.

FIG. 5A is a sectional plan view showing the layout of the tumble sensors, and FIG. 5B is a front sectional view of the same. The tumble sensors 46 and 47 include resin-made cases 50 and 51 in which magnet rollers 48 and 49 are contained, respectively. Magnetic sensors 52 and 53 are provided on the outer surface of the central portion of the cases 50 and 51. The rollers 48 and 49 are rollable in the directions of arrows X and Y in the cases 50 and 51, respectively. The inside shapes of the cases 50 and 51 are roughly U shaped, with a central portion being lower, so that the rollers 48 and 49 rest at the centers in the cases 50 and 51 when the vehicle body is not inclined.

The direction Y is along the forward running direction of the ATV 1, and the direction X is set to be orthogonal to the direction Y. In addition, the extension line of the center line CL1 of the roller 48 crosses at least the case 51 of the tumble sensor 47. Specifically, the tumble sensor 46 and the tumble sensor 47 are disposed roughly at the same position in the vehicle body front-rear direction.

This layout of the sensors can be modified. For example, the extension line of the center line CL2 of the roller 49 crosses at least the case 50 of the tumble sensor 46. In this case, the tumble sensor 46 and the tumble sensor 47 are disposed roughly at the same position in the vehicle body width direction.

The magnetic sensors 52 and 53 generate outputs according to the magnitudes of magnetic fields sensed in response to the displacements of the rollers 48 and 49. In this example, as the inclination of the vehicle body increases, the roller moves farther away from the magnetic sensor, so that the output level of the magnetic sensor decreases.

As such a type of sensor, there can be used, for example, the one described in Japanese Patent Laid-open No. Sho 60-255589. However, the tumble sensor is not limited to this type, and any of known type of inclination sensor can be used.

Figure 6:
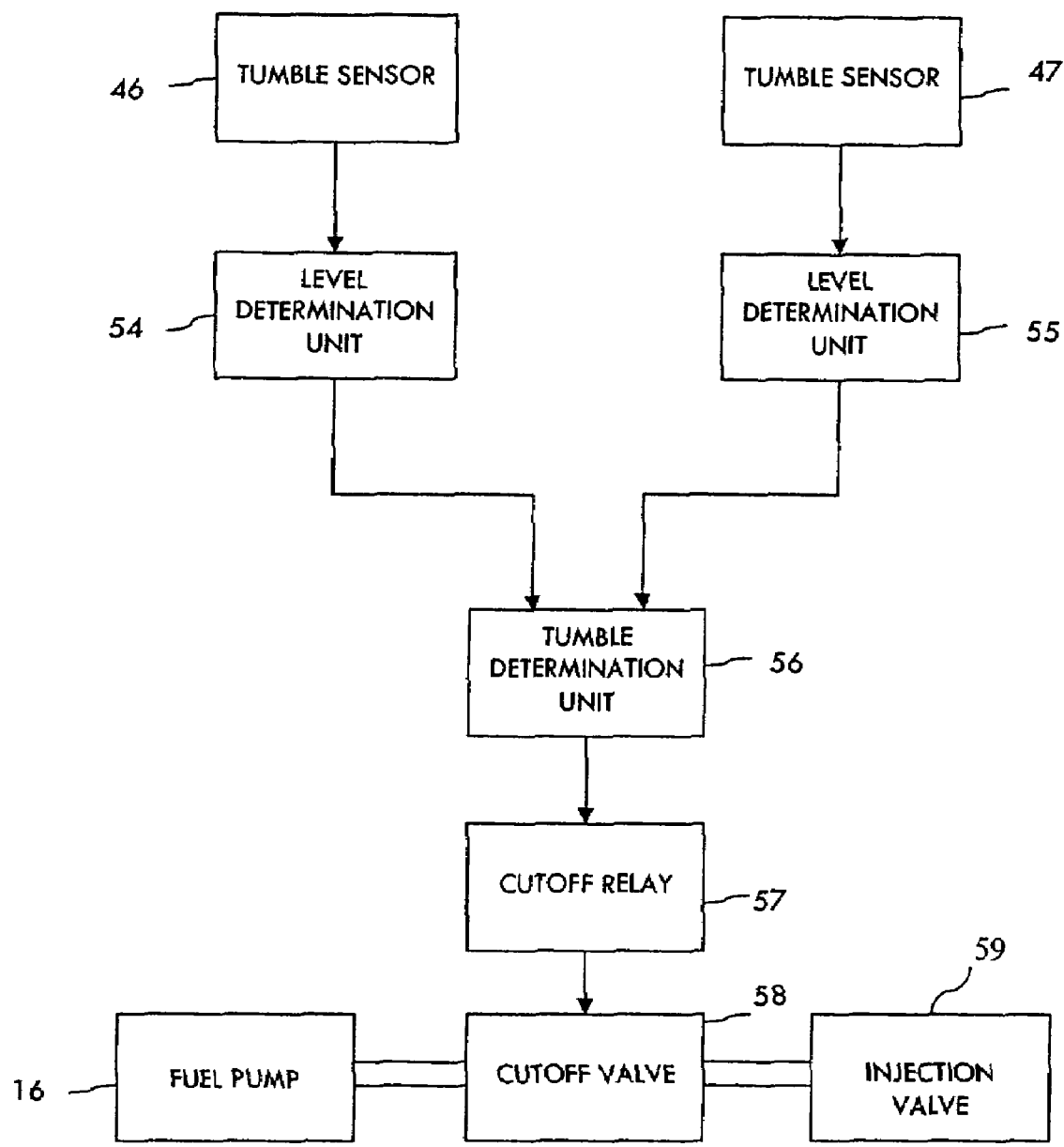
FIG. 6 is a block diagram showing one example of a fuel supply shut off system.

FIG. 6 is a block diagram showing one example of a fuel supply stopping system using tumble sensors. In FIG. 6, output signals from the tumble sensors 46 and 47 (here, outputs from the magnetic sensors 52 and 53) are compared with tumble reference levels in level determination units 54 and 55. The results of determination of the levels in the level determination units 54 and 55 are used for tumble determination in a tumble determination unit (or controller) 56. Algorithms for the tumble determination can be set in various ways, for example, the occurrence of a tumble may be determined when the level of the signal from one of the sensors shows a tumble with reference to the tumble reference level, or the tumble determination may be made on the basis of the detection levels at both the sensors in combination. The level determination units 54 and 55 and the tumble determination unit 56 can be composed of a microcomputer.

Incidentally, the tumble determination may be not dependent on only the detection signals from the tumble sensors 46 and 47; for example, the tumble determination may be conducted by taking into account throttle opening, speed, acceleration, brake signal, steering handlebar steering angle, or the like.

When it is determined in the tumble determination unit 56 that a tumble condition has occurred and a tumble condition signal is sent to cut off relay 57, then, fuel cutoff relay 57 is turned ON, to close a cutoff valve 58. The cutoff valve 58 may be provided, for example, at an intermediate portion of the fuel hose 17. This ensures that upon a tumble of the vehicle body, the cutoff valve 58 is closed, whereby the fuel supply from the fuel pump 16 to a fuel injection valve 59 is stopped. Incidentally, the fuel supply may be stopped by closing a fuel supply pipe (fuel hose 17) in this manner, or, alternatively, by cutting off the power supply to the fuel pump 16.

While the above embodiment has been described based on an example in which the fuel pump 16 is contained in the fuel tank 3, the layout of the fuel pump is not limited to this example; the fuel pump may be separately provided exterior to the fuel tank.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

I claim:

1. A saddle ride type all-terrain vehicle having an engine and a saddle type driver's seat, said saddle ride type all-terrain vehicle comprising:
   a steering shaft for supporting a steering handlebar of the vehicle;
   a fuel tank disposed rearward of said steering shaft,
   a first sensor detecting an inclination in the left-right direction of the vehicle;
   a second sensor detecting an inclination in the front rear direction of the vehicle, wherein said first and second sensors are disposed between said steering shaft and said fuel tank;
   a controller receiving outputs from said first and second sensors, determining a tumble condition based on said outputs, and then outputting a tumble condition signal; and
   a fuel shut-off element for shutting off the supply of fuel to the engine when said tumble condition signal is received from said controller, and further
   wherein said fuel tank has a shape provided with a recess at a front portion thereof, and wherein said first and second sensors are disposed in said recess.

2. The saddle ride type all-terrain vehicle, according to claim 1, wherein said first and second sensors each include a movable portion displaceable in response to inclination of the vehicle.

3. The saddle ride type all-terrain vehicle, according to claim 2, wherein said first and second sensors are oriented such that extension lines, corresponding to directions of movement of said movable portions, intersect orthogonally.

4. The saddle ride type all-terrain vehicle, according to claim 2, wherein said first and second sensors are oriented such that an extension line, corresponding to a direction of movement of said movable portion of one of said first and second sensors, crosses the other of said first and second sensors.

5. The saddle ride type all-terrain vehicle, according to claim 2, further comprising:
   a steering shaft for supporting a steering handlebar of the vehicle; and
   a fuel tank disposed rearward of said steering shaft,
   wherein said first and second sensors are disposed between said steering shaft and said fuel tank.

6. The saddle ride type all-terrain vehicle, according to claim 3, further comprising:
   a steering shaft for supporting a steering handlebar of the vehicle; and
   a fuel tank disposed rearward of said steering shaft,
   wherein said first and second sensors are disposed between said steering shaft and said fuel tank.

7. The saddle ride type all-terrain vehicle, according to claim 4, further comprising:
   a steering shaft for supporting a steering handlebar of the vehicle; and
   a fuel tank disposed rearward of said steering shaft,
   wherein said first and second sensors are disposed between said steering shaft and said fuel tank.

8. The saddle ride type all-terrain vehicle, according to claim 2, wherein said fuel tank has a shape provided with a recess at a front portion thereof, and wherein said first and second sensors are disposed in said recess.

9. The saddle ride type all-terrain vehicle, according to claim 3, wherein said fuel tank has a shape provided with a recess at a front portion thereof, and wherein said first and second sensors are disposed in said recess.

10. The saddle ride type all-terrain vehicle, according to claim 4, wherein said fuel tank has a shape provided with a recess at a front portion thereof, and wherein said first and second sensors are disposed in said recess.

11. The saddle ride type all-terrain vehicle, according to claim 1, wherein said fuel shut-off element is a fuel shut-off valve.

12. The saddle ride type all-terrain vehicle, according to claim 1, wherein said fuel shut-off element cuts off a supply of power to a fuel pump.

13. The saddle ride type all-terrain vehicle, according to claim 1, wherein said tumble condition is determined by said controller, also based on one or more of a throttle opening, a vehicle speed, a vehicle acceleration, a brake signal and a steering angle.

14. A saddle ride type all-terrain vehicle having an engine and a saddle type driver's seat, said saddle ride type all-terrain vehicle comprising:
   a first sensor detecting an inclination in the left-right direction of the vehicle;
   a second sensor detecting an inclination in the front-rear direction of the vehicle;

a controller receiving outputs from said first and second sensors, determining a tumble condition based on said outputs, and then outputting a tumble condition signal;

a fuel shut-off element for shutting off the supply of fuel to the engine when said tumble condition signal is received from said controller;

a steering shaft for supporting a steering handlebar of the vehicle; and a fuel tank disposed rearward of said steering shaft and having a shape provided with a recess at a front portion thereof, wherein said first and second sensors are disposed in said recess, rearward of said steering shaft, and further wherein said first and second sensors each include a movable portion displaceable in response to inclination of the vehicle, wherein said first and second sensors are oriented such that extension lines, corresponding to directions of movement of said movable portions, intersect orthogonally.

15. The saddle ride type all-terrain vehicle, according to claim 14, wherein one of said extension lines crosses one of said first and second sensors.

* * * * *